Patented Nov. 15, 1949

2,488,274

UNITED STATES PATENT OFFICE 2,488,274

6-METHOXY-8-(5-ISOPROPYL AMINO PENTYLAMINO) QUINOLINE COMPOUNDS AND QUININE AS ANTIMALARIALS

Nathan L. Drake, University Park, Md., and John O'Neill Van Hook, Philadelphia, Pa., assignors to the United States of America as represented by the Secretary of the Army No Drawing. Original application February 19, 1946, Serial No. 648,832. Divided and this application February 6, 1948, Serial No. 6,808

3 Claims. (Cl. 167—67)

The present invention relates to a novel antimalarial drug that appears to be characterized by a unique combination of chemotherapeutic properties, and to methods of preparing the same.

Within the past decade or more pamaquine (I) and plasmocide (II)

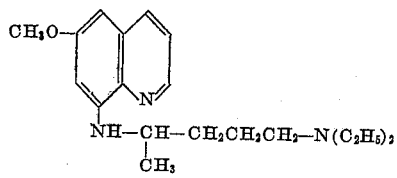

I. Pamaquine

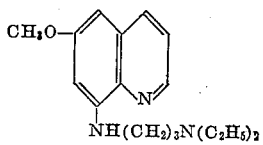

II. Plasmocide have stimulated considerable interest among malariologists because of their reported ability to exert a curative action against vivax malaria when administered concurrently with a suppressive drug such as quinine. Presumably this curative action of these drugs results from the ability of the administered drugs, or possibly of some degradation product thereof, to attack the exoerythrocytic phases of the disease. Regardless of the explanation, however, their efficacy when administered as indicated above to patients suffering from vivax malaria distinguish them from all other antimalarial drugs heretofore reported in the literature, including both quinine and quinacrine in that they represent the only previously known drugs that are curative in the vivax form of the disease.

Despite this unique and highly desirable property of pamaquine and plasmocide, they have not been generally employed by the medical profession in the treatment of vivax malaria. The reason for the comparative non-use of these unique drugs arises at least in part from their highly toxic character when given at curative dosage levels. Pamaquine toxicity is characterized by the occurrence of gastro-intestinal symptoms, including severe abdominal cramps, nausea, etc.; by various symptoms referable to the central nervous system, including headache, muscular pain, etc.; by methemoglobinemia, resulting in cyanosis, weakness, intolerance to exercise, etc.; and most importantly, by hemolytic episodes, including hemolytic anemia, the latter symptom, in particular, constituting so serious a hazard to life as to require an immediate cessation of pamaquine administration. Some of the foregoing manifestations of pamaquine toxicity are observed in a high percentage of patients receiving the recommended dosage regime, which includes amounts of drug ranging from 30 to 90 milligrams of pamaquine per day. Furthermore, although the therapeutic effect of the pamaquine appears to be enhanced when it is combined with quinine, its toxicity is also increased at the same time. The most serious objection to pamaquine therapy, however, is the fact that an appreciable proportion (perhaps 5–10%) of individuals, especially those of non-Caucasian races, receiving as little as 30 milligrams of this drug per day develop, in as little as 2 to 5 days in some cases, such symptoms of hemolytic anemia as to necessitate an immediate cessation of pamaquine therapy and the prompt initiation of vigorous measures to combat these adverse symptoms.

Because of the highly toxic character of pamaquine, the recommended minimal safeguards for patients receiving this drug include twice daily visits by a physician and daily hemoglobin determinations reported promptly so that pamaquine therapy may be terminated at once should an indication of developing anemia be observed. Pamaquine therapy is therefore used in the treatment of human vivax malaria only in very rare instances and under the most carefully controlled conditions. Furthermore, the unusually high susceptibility of non-Caucasians (e. g., Negroes, Chinese, etc.) to pamaquine-induced hemolytic anemia renders this drug of practically no utility whatsoever for the treatment of malaria in native populations living in the Tropic zone where, of course, the incidence of the disease is especially high.

As regards the toxicity of plasmocide (II) on the basis of studies in rats, dogs and monkeys, it is obvious that plasmocide is distinctly more toxic than pamaquine. In the rat and the dog, there appears to be no qualitative difference in the reactions to pamaquine and plasmocide. In the monkey, however, the difference in qualitative reactions is astounding. Pamaquine produces a profound depression of physical activity, severe cyanosis, anemia, leucopenia and neutropenia. Plasmocide on the other hand, produces severe central nervous system derangements characterized by nystagmus, loss of pupillary reflexes, loss of equilibrium, inability to coordinate movements of the limbs and in some instances spastic paralysis. These physiological derangements are associated with some of the most severe and irreversible brain lesions ever encountered in a reaction to a drug. Extensive work on plasmocide reported in the Russian literature indicates that the irreparable damage to the central nervous system as manifested in the experiments on monkeys is also characteristic of the toxicity of this drug in man.

From the foregoing it will be apparent that although both pamaquine and plasmocide are highly toxic, plasmocide is much the more dangerous of these two drugs. For that reason, in discussing the toxicities of the new compounds of the present invention, reference will hereinafter be made only to pamaquine as a basis for comparison.

The object of the present invention is to provide a new and improved antimalarial drug.

A more particular object is the provision of a novel drug characterized by high effectiveness against vivax malaria, coupled with relatively low toxicity to human subjects compared to the toxicity of pamaquine.

Still another object is the provision of an antimalarial drug capable of exerting a curative action against vivax malaria at dosages well tolerated in human subjects.

A further object is to provide a drug having the curative action of pamaquine against human vivax malaria, but characterized by significantly lower toxicity to the human subject.

Other objects and advantages of the invention will be apparent as the description progresses.

The foregoing objects were attained as a result of an extended investigation undertaken with the view to widening the margin between the amount of drug which would exert a curative action comparable to that of pamaquine, and the amount that would produce toxic manifestations in a sizable proportion of individuals receiving the drug. The objectives were ultimately realized by the synthesis of a novel analogue of pamaquine having the general formula III

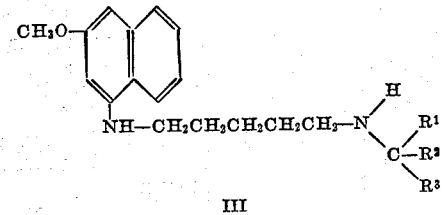

III where $R^1$ and $R^2$ are alkyl groups and $R^3$ is either hydrogen or an alkyl group. The preferred representative of this class is 6-methoxy-8-(5'-isopropylaminopentylamino)quinoline wherein $R^1$ and $R^2$ are methyl groups and $R^3$ is hydrogen. This compound (hereinafter referred to as SN 13,276), either as a free base or in the form of a salt, on the basis of comparative toxicity tests in the monkey, was found to be about one-fourth to one-half as toxic as pamaquine. Furthermore, on the basis of comparative tests against *P. lophurae* in the duck, it appears to be characterized by an antimalarial effectiveness approximately 1 to 3 times that of pamaquine. On the basis of these data, the therapeutic advantage of this novel antimalarial over pamaquine is therefore of the order of about 4 to 8. These data are in part corroborated by preliminary, but as yet incomplete trials in human subjects, which tentatively indicate (1) That SN 13,276 is about one-half as toxic to man as pamaquine based on methemoglobin formation, symptomatology, and depression of white blood counts;
(2) That it is at least equal to pamaquine in antimalarial effectiveness in human patients suffering from vivax malaria; and
(3) That, when used in combination with suppressive amounts of a drug such as quinine (which appears to enhance the therapeutic effect of SN 13,276), it exerts a curative action against vivax malaria at dosages well tolerated by the patient.

This new compound therefore appears to possess a unique combination of chemotherapeutic properties, namely, curative action against vivax malaria, coupled with a significantly lower toxicity to the human host, relative to pamaquine.

In order more clearly to disclose the nature of the present invention, several specific examples illustrating the preparation of typical compounds will hereinafter be described in considerable detail. It should be understood, however, that this is done solely by way of example and is intended neither to delineate the scope of the invention nor limit the ambit of the appended claims.

EXAMPLE I

PREPARATION OF 8-(5'-ISOPROPYLAMINOPENTYL-AMINO)-6-METHOXY-QUINOLINE (SN 13,276) THROUGH THE GABRIEL SYNTHESIS

The reactions described below for the preparation of SN 13,276 may be represented by the following scheme:

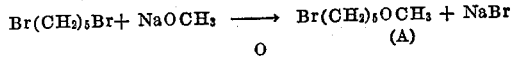

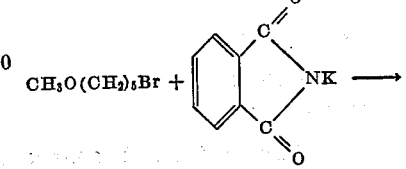

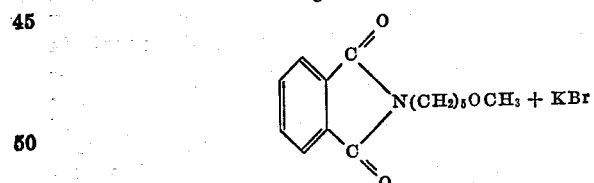

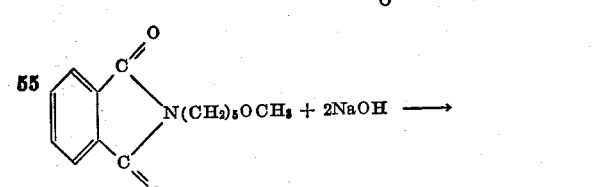

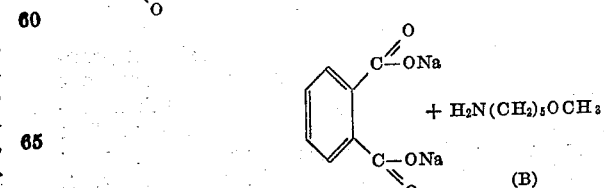

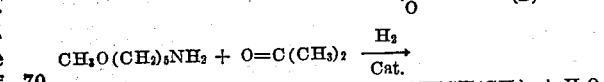

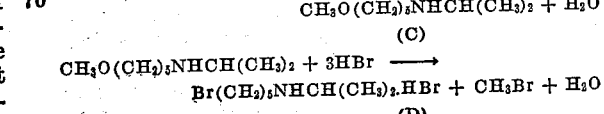

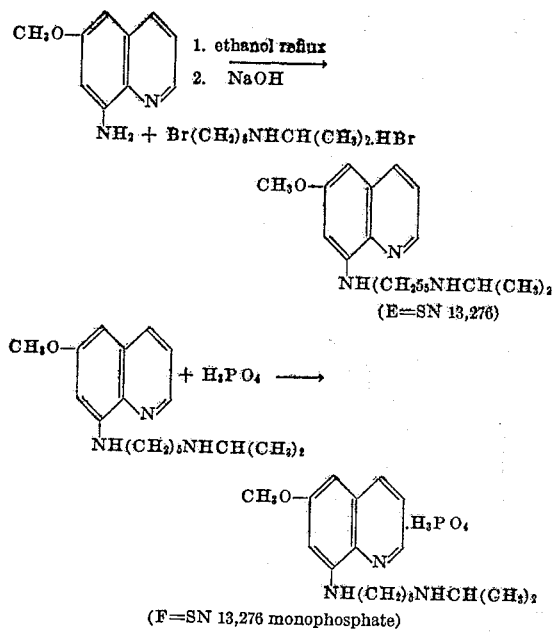

A. 1-bromo-5-methoxypentane

Four moles of sodium methoxide in 2.5 liters of anhydrous methanol is added over about two hours to a solution of 4.0 moles (920 g.) of 1,5-dibromopentane in ether or some other inert solvent. The mixture is stirred under reflux during addition of the methoxide and subsequently until the reaction is substantially complete, whereupon the greater part of the solvent is removed by distillation. The mixture is then filtered and the filter cake is washed with solvent. The combined washings and filtrate are then extracted several times with water and finally dried. After removal of the drying agent by filtration, the solvent is distilled from the mixture and the residue is fractionated through a suitable column. After a forerun consisting mainly of 1,5-dimethoxypentane, the main fraction, 1-bromo-5-methoxypentane, boils at 124–6° C./100 mm. The yield is approximately 40%.

B. 1-amino-5-methoxypentane

An equimolar mixture of potassium phthalimide and 1-bromo-5-methoxypentane is heated at 150–170° C. for 18 hours with stirring. The product is extracted with several portions of hot alcohol and filtered from the potassium bromide. After removal of the bulk of the alcohol by distillation, the residue is refluxed for five hours with a large excess of a 1:1 solution of potassium hydroxide in water. The amine liberated is extracted, dried, and distilled. 1-amino-5-methoxypentane boils at 167–170° C.

1-amino-5-methoxypentane can also be prepared by the method of Shreve and Burtsfield [Ind. Eng. Chem., 33, 218 (1941)] by the reaction of sodamide in liquid ammonia on 1-bromo-5-methoxypentane. The yield is about 40%.

1-amino-5-methoxypentane can also be prepared by the reaction between 1-bromo-5-methoxypentane and ammonia.

C. 1-isopropylamino-5-methoxypentane

This compound can be prepared by several methods:

(1) A mixture of one mole of 1-bromo-5-methoxypentane and 2.2 moles of isopropylamine is stirred under reflux until reaction is substantially complete. The mixture is poured into an excess of dilute hydrochloric acid and extracted with a suitable solvent to remove any unreacted 1-bromo-5-methoxypentane. The aqueous solution is then made strongly alkaline with a considerable excess of 50% potassium hydroxide solution and extracted with ether. The extract is dried over anhydrous potassium carbonate, and after removal of the drying agent by filtration, is distilled. After removal of the ether and excess isopropylamine, the 1-isopropylamino-5-methoxy-pentane is collected. 1-isopropylamino-5-methoxypentane boils at 93° C./20 mm. The yield is above 80%.

(2) 1-isopropylamino-5-methoxypentane can also be prepared from 1-amino-5-methoxypentane by a method similar to the one described by Cope and Hancock [J. Amer. Chem. Soc. 64, 1503 (1942)] for the preparation of 2-isopropylamino-ethanol. The yield of 1-isopropylamino-5-methoxypentane is approximately 90% based on 1-amino-5-methoxypentane. The substance boils at 93° C./20 mm.

D. 1-bromo-5-isopropylaminopentane hydrobromide

A solution of 1-isopropylamino-5-methoxypentane in a large excess of concentrated hydrobromide acid is heated under reflux for about three hours. Excess water and hydrobromic acid are removed by distillation under reduced pressure and the last traces of liquid are removed by heating at 120° C. for an hour under a pressure of less than 1 mm. The resulting product can be used directly for the preparation of SN 13,276.

E. 8-(5'-isopropylaminopentylamino)-6-methoxy-quinoline (SN 13,276)

A solution of 0.175 mole of 1-bromo-5-isopropyl-aminopentane hydrobromide and 61 g. (0.35 mole) of 8-amino-6-methoxyquinoline in 300 ml. of commercial absolute ethanol is heated under reflux for 60 hours. The mixture is then poured into 750 ml. of water and the resulting solution is made strongly alkaline by the addition of a considerable excess of 33% sodium hydroxide solution. The alkaline solution is extracted with ether; after removal of the ether from the combined extracts, the residual oil is distilled. The forerun consists mainly of unreacted 8-amino-6-methoxyquinoline; the product 8-(5'-isopropylaminopentylamino)-6-methoxyquinoline, distils at 150–167° C./2 microns (bath temperature 170–195° C.). The yield is about 50% based on 5-bromo-1-isopropylaminopentane hydrobromide.

F. 8-(5'-isopropylaminopentylamino-6-methoxy-quinoline monophosphate (SN 13,276 monophosphate)

One hundred fifteen grams (1 mole) of 85% phosphoric acid is added as rapidly as possible to a well-stirred solution of 300 g. (1 mole) of 8-(5'-isopropylaminopentylamino) - 6 - methoxyquinoline in 3500 ml. of refluxing ethanol (95%). A small amount of seed is added and the mixture is heated under reflux and stirred for 15 minutes. The flask is then cooled in an ice bath for 3 hours while stirring is continued.

The precipitated drug is filtered and washed with about 500 ml. of cold 95% alcohol. The dried product weighs about 350–375 g.; it melts at 189–190° C.

EXAMPLE II

ALTERNATE METHOD OF PREPARING SN 13,276 FROM DIHYDROPYRANE

The reactions described below represent an alternate approach to SN 13,276.

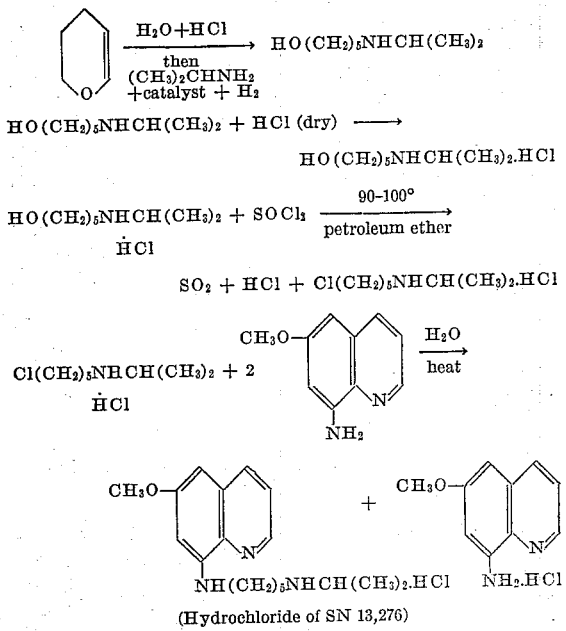

(Hydrochloride of SN 13,276)

A. 5-isopropylamino-1-pentanol hydrochloride

A well-stirred mixture of 84 ml. of concentrated hydrochloric acid and 1 liter of water is cooled to 0–5° in an ice bath. The ice bath is removed and 336 g. (4.0 moles) of dihydropyrane is added in one portion. The resulting turbid mixture is stirred until it becomes clear at which time the temperature of the mixture will have reached a maximum of about 35° C. Stirring is continued for about 10 minutes; the acid is then neutralized with isopropylamine and the pH adjusted at about 8.0. During neutralization of the acid the temperature of the mixture is held below 15° C. by means of an ice bath. Two hundred thirty six grams (4.0 moles) of isopropylamine is then added; the amine is added in portions such that the temperature of the mixture does not exceed 20° C.

The resultant mixture is transferred to a hydrogenation bomb, hydrogenation catalyst is added, and the mixture is hydrogenated at 2000–3000 p. s. i. and about 25° C. Hydrogenation is substantially complete in about 3 hours whereupon the mixture is removed, filtered from the catalyst, and made strongly alkaline by the addition of 60 g. of solid sodium hydroxide. The mixture is then boiled until its vapor temperature reaches 100° C. to remove excess isopropylamine; at this point two phases are present.

The layers are separated and the organic layer is added to about four liters of petroleum ether (90–100°). The resultant mixture is dried by azeotropic distillation and the dry, one-phase solution is filtered to remove inorganic material.

Dry hydrogen chloride is then blown into the solution whereupon 5-isopropylamino-1-pentanol hydrochloride separates. The product is filtered and dried to constant weight at 60° C.

The yield is about 513 g. (71%); the crude product melts at 92–96° C. Recrystallization of the crude product yields a substance that melts at 97.7–98.4° C.

B. 5-chloro-1-isopropylaminopentane hydrochloride

Thionyl chloride (1056 g., 8.8 moles) dissolved in 1 liter of petroleum ether (90–100°) is added slowly to an ice-cold suspension of 1448 g. (8.0 moles) of 5-isopropylamino-1-pentanol hydrochloride in 8 liters of 90–100° petroleum ether; the addition requires about two hours. The hydrochloride becomes a thick gummy oil which gradually becomes crystalline during the subsequent heating and cooling.

After the thionyl chloride has been added, the mixture is warmed with continued stirring to 50° C. for 1 hour and is then heated under reflux for 4 hours. The mixture is cooled and the product filtered and dried to constant weight. The yield is 1545 g. (97%); the crude product melts at 112–120° C. Recrystallization yields a substance that melts at 120–123° C.

C. 8-(5'-isopropylaminopentylamino)-6-methoxy-quinoline

This substance is prepared by substantially the same method as that described in Example III part C.

After the hydrochloride of 8-amino-6-methoxyquinoline is removed by filtration, the combined filtrate and washings are made basic to Congo red by the addition of sodium acetate. Any precipitated hydrochloride of SN 13,276 is filtered off, and the resulting solution is extracted several times with ether to remove any unreacted 8-amino-6-methoxyquinoline. The buffered solution is then made strongly alkaline with 33% sodium hydroxide solution and to it is added the hydrochloride of SN 13,276 already filtered off; the free base is extracted with a suitable solvent.

After removal of the solvent by distillation, the product is distilled. The refractive index of the crude product is $N_D^{20}=1.5824$. The yield is 60–70%.

EXAMPLE III

THE PREPARATION OF 8-(5'-TERT.-BUTYLAMINOPENTYLAMINO)-6-METHOXYQUINOLINE (SN 13,473)

The reactions described below for the preparation of SN 13,473 may be represented by the following scheme:

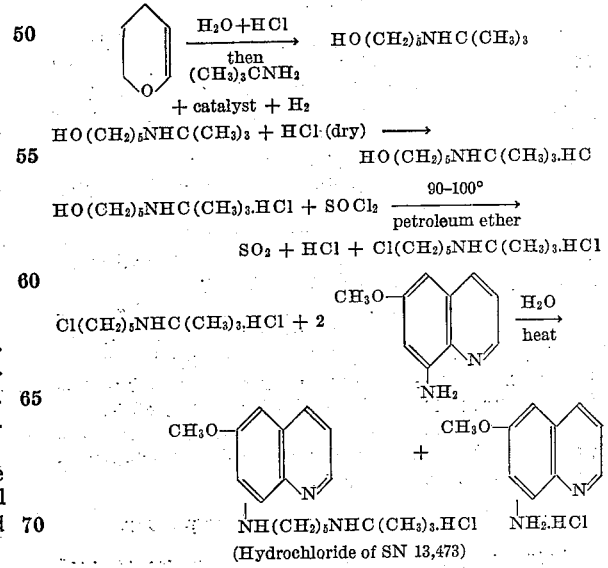

(Hydrochloride of SN 13,473)

A. 1-tert.-butylamino-5-pentanol hydrochloride

Seventy-five grams (0.9 mole) of dihydropyrane is added rapidly to a well-stirred solution of 19 ml. of concentrated hydrochloric acid in 200 ml. of water cooled to 10°. The temperature of the mixture rises rapidly for a few minutes and then begins to fall. When the temperature of the mixture has begun to drop from the maximum, an ice bath is placed around the container and the pH of the solution is brought to about 8.0 by the addition of tert.-butyl amine; approximately 18 g. of amine is required. An additional 66 g. of tert.-butyl amine (0.9 mole) is then added, and the mixture is transferred to an apparatus for catalytic hydrogenation.

The hydrogenation is conducted under any pressure desired in the presence of a noble or base metal catalyst. The use of Adams' catalyst and a pressure of about 100 atmospheres bring about completion of the hydrogenation in a few hours. After removal of the catalyst by filtration, the mixture is made strongly alkaline by the addition of an excess of 33% sodium hydroxide solution and the excess of tert.-butyl amine is removed by distillation until the temperature of the distilling vapor reaches about 100° C. The mixture is cooled and the layers separated. The separated organic layer is mixed with about one liter of 90-100° C. petroleum ether and the resulting two phase system is dried by azeotropic distillation, whereupon the second phase disappears.

The dry petroleum ether solution of the amino-alcohol is treated with dry hydrogen chloride; the precipitate of 1-tert.-butylamino-5-pentanol hydrochloride is filtered and dried. The crude product melts at 123-143° C.; the yield is about 60%. Recrystallization from a mixture of absolute ethanol, acetone, and ether yields a product which melts at 153-153.5° C.

B. *1-tert.-butylamino-5-chloropentane hydrochloride*

The crude hydrochloride described in A above is treated with excess thionyl chloride in 90-100° petroleum ether (1 mole hydrochloride: 1.5 mole thionyl chloride: 1250 ml. petroleum ether). The thionyl chloride is added slowly to a suspension of the hydrochloride in petroleum ether while the mixture is cooled in an ice bath. The cooling bath is then removed and the mixture is heated under reflux for several hours.

The product separates, first as an oil and later as a tacky solid which becomes only slightly tacky by the end of the heating period. The mixture is cooled and the product filtered. Recrystallization yields a product which melts at 125-127° C.; the crude product can be used directly in the preparation of SN 13,473.

C. *8-(5'-tert.-butylaminopentylamino)-6-methoxyquinoline (SN 13,473)*

One hundred twenty grams (0.56 mole) of crude 1-tert.-butylamino-5-chloropentane hydrochloride is heated with 196 g. (1.12 moles) of 8-amino-6-methoxyquinoline and 140 ml. of water. The temperature of the mixture is held at 45-50° C. for 12 hours, and then at 90-100° for five hours.

The resultant melt is poured into 150 ml. of hot water containing 96 ml. of concentrated hydrochloric acid. The flask is rinsed with an additional 100 ml. of hot water and the rinsings are added to the main portion. The acid solution is cooled to 15° C. whereupon the hydrochloride of 8-amino-6-methoxyquinoline crystallizes; this hydrochloride is filtered and washed with 300 ml. of cold water.

The washings are combined with the original filtrate and sodium acetate is added to bring the pH to about 5.0. The hydrochloride of SN 13,473 separates as a grey precipitate contaminated with some 8-amino-6-methoxyquinoline. Recrystallization yields a product which melts at 169-170° C.

*Relation to other pamaquine analogues*

It is of course well known that a very large number of synthetic 8-aminoquinoline derivatives have heretofore been tested as antimalarials, most of these being variations of the pamaquine molecule. So far as is known, however, prior to the present invention, none of these analogues or homologues was found to possess the curative action against vivax malaria that uniquely characterizes pamaquine and plasmocide. Furthermore, although several 8-(mono-alkylaminoalkyleneamino)quinolines have heretofore been suggested, those of the type IV,

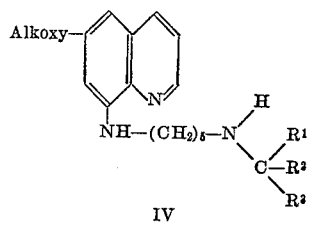

IV where $R^1$ and $R^2$ are alkyls and $R^3$ is either hydrogen or alkyl, were apparently neither considered, prepared nor investigated as antimalarials, so far as we have been able to determine. This general type IV therefore appears to represent a novel class of antimalarial drugs.

It will be apparent to those skilled in the art that many variations in the foregoing illustrative examples may be made without departing from the spirit and scope of the invention. Thus the isopropyl group in the basic side chain of SN 13,276 may be replaced by other groups of the type

where $R^1$ and $R^2$ represent alkyl groups, either the same or different, as is the case in the corresponding isobutyl and iso-amyl homologues of SN 13,276, and similar branched chain secondary amine types. Likewise, if desired, the tertiary butyl group of SN 13,473 could be replaced by other tertiary alkyl groups of the type

where $R^1$, $R^2$, and $R^3$ are all alkyl groups.

It is also apparent that the compounds of the present invention may be prepared in the form of their salts using a variety of acids organic or inorganic in different equivalent proportions. All these and similar variations, modifications and extensions of the principles involved are to be understood as included within the scope of the appended patent claims.

This application is a division of Serial No. 648,832, filed by applicants on February 19, 1946.

Having thus described our invention, what we claim and wish to secure by Letters Patent is:

1. A composition adapted for malaria therapy comprising quinine admixed with a salt of 8-(5'-isopropylaminopentylamino)-6-methoxyquinoline.

2. A composition adapted for malaria therapy comprising quinine admixed with a salt of 8-(5'-tert.-butylaminopentylamino)-6-methoxyquinoline.

3. A composition adapted for malaria therapy comprising a mixture of quinine and a salt of a compound having the structural formula

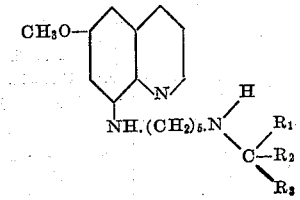

wherein the $(CH_2)_5$ groups are in a straight chain, and where $R^1$ and $R^2$ are lower alkyl groups and $R^3$ is selected from the group consisting of hydrogen and lower alkyl.

NATHAN L. DRAKE.
JOHN O'NEILL VAN HOOK.

REFERENCES CITED

The following references are of record in the file of this patent:

Wood-Osol, U. S. Dispensatory, 23rd ed., 1943, J. P. Lippincott, Phila., pages 813–814. (Copy in Division 43.)